United States Patent
Arnold

[15] 3,672,040
[45] June 27, 1972

[54] METHOD OF DEVELOPING COILS OF A COIL GROUP FOR A MAGNETIC CORE

[72] Inventor: Richard B. Arnold, Fort Wayne, Ind.
[73] Assignee: General Electric Company
[22] Filed: June 1, 1970
[21] Appl. No.: 42,189

Related U.S. Application Data

[60] Division of Ser. No. 884,145, Dec. 11, 1969, Pat. No. 3,579,791, which is a continuation-in-part of Ser. No. 748,406, July 29, 1968, abandoned.

[52] U.S. Cl.............................29/596, 29/205 R, 29/205 D, 29/606, 140/92.1, 242/7.09, 242/82
[51] Int. Cl........................................................H02k 15/00
[58] Field of Search.............29/596, 598, 606, 205 D, 205 R; 140/92.1; 242/82, 7.09

[56] References Cited

UNITED STATES PATENTS 3,522,650  8/1970  Cutler et al...............................29/596
3,557,432  1/1971  Pavesi...................................29/205 D

*Primary Examiner*—John F. Campbell
*Assistant Examiner*—Carl E. Hall
*Attorney*—John M. Stoudt, Radford M. Reams, Ralph E. Krisher, Jr., Oscar B. Waddell and Frank L. Neuhauser

[57] ABSTRACT

A method of developing one or more coil groups of electrically conductive wire in a coil group accommodating device such as coil insertion tooling. A coil turn-forming assembly is positioned with a snap-out winding form plate in alignment with a corresponding turn-gauging step and engaging a coil group accommodating device adjacent a turn receiving slot. Turns of wire are generated about the winding form plate and turn-gauging step and received in the turn receiving slot during the generation operation. Thereafter, other snap-out winding form plates are sequentially positioned in alignment with a corresponding turn-gauging step and engaging the coil group accommodating device adjacent corresponding turn receiving slots. The turn generating operation is repeated using each winding form plate and turn-gauging step, with the generated turns being received in the corresponding turn receiving slot during that generation operation.

When all the coils for one coil group have been developed in the coil group accommodating device, the coil group accommodating device can be rotated to bring other turn receiving slots in alignment with the coil turn-forming assembly. Then the desired number of operations, as described above, can be repeated to develop, in the coil group accommodating device, additional coil groups. When the coil group accommodating device is coil injection tooling, the developed coils can thereafter be inserted from the coil injection tooling into preselected slots of a magnetic core.

15 Claims, 15 Drawing Figures

Inventor:
Richard B. Arnold,
By Radford M Reams
Attorney.

INVENTOR.
Richard B. Arnold,
BY Radford M Reams
Attorney.

INVENTOR.
Richard B. Arnold,
BY Radford M. Reams
Attorney.

3,672,040

METHOD OF DEVELOPING COILS OF A COIL GROUP FOR A MAGNETIC CORE

CROSS-REFERENCE TO RELATED APPLICATIONS

This application is a division of my co-pending application Ser. Number 884,145 now U.S. Pat. No. 3,579,791, filed on Dec. 11, 1969; which application is a continuation-in-part of my application Ser. No. 748,406 filed July 29, 1968, now abandoned.

BACKGROUND OF THE INVENTION

This invention relates generally to methods for developing wound coils for use in electromagnetic devices. More particularly, the invention relates to a method for developing coils of electrically conductive wire for use in a stator member of a dynamoelectric machine such as a motor.

Conventionally, the coils for a particular coil group of the stator of a dynamoelectric machine, such as a motor, have been formed by winding on a collapsible arbor. After the particular coil group has been wound on the arbor, the arbor is collapsed into a smaller cross-sectional configuration. The coils are removed by hand, taped or clipped and, in one approach, are inserted by hand into a coil group accommodating device, such as a coil injection machine or tooling for subsequent insertion into the dynamoelectric machine.

This is a costly and time consuming method, even if the coils are transferred from the arbor to the coil accommodating device mechanically. There is a need therefore for a coil developing method by which a coil group can be developed in the coil injection tooling, or other coil group accommodating device such as a transfer mechanism, without using a collapsible arbor.

Accordingly, it is a general object of my invention to provide an improved method for developing coils for use in an electromagnetic device.

A more specific object of the present invention is to provide an improved method for developing at least one coil group directly into a coil injection tooling or other coil group accommodating device that does not require the use of a collapsible arbor.

It is still another object of the present invention to provide an improved method for developing at least one coil directly into coil injection tooling or other coil group accommodating device, which method may selectively vary the lengths of successive turns of the coil.

It is another more specific object of the present invention to develop an improved method for developing a coil group wherein the coil group is developed directly in the coil group accommodating or coil injection tooling and then inserted therefrom into the slots of an electromagnetic device such as a stator core.

A further object of my invention is to provide an improved method for developing a coil group for a dynamoelectric machine, such as an electric motor, that is readily adapted for use by a turntable or other conveyor means, such as in an in-line type of production operation.

A still further object of my invention is to provide an improved method of developing at least one coil and selectively varying the length of selected successive turns of wire in the coil during generation of the wire turns for such coil.

SUMMARY OF THE INVENTION

In accordance with one form of my invention, I have provided a novel method for developing in only one coil group accommodating means at least a pair of coil groups. In this form, the method includes the steps of placing a coil group accommodating means generally in alignment with the snap-out plates of a coil form assembly thereby to receive turns generated thereon, positioning the jump form portion of the coil form assembly to place an interrupted step of the jump form portion in the path of the wire and concurrently releasing an associated snap-out winding form plate to bring its fill-in form section into engagement with the coil group accommodating means to define a first turn-gauging step for winding turns of a first coil. In this form of the invention, the method includes the additional steps of winding a first coil of wire having a predetermined number of turns on the first turn-gauging step and then winding the turns of remaining coils of the coil group on turn-gauging steps formed by successively locating one of the remaining interrupted steps in the path of the wire being wound and concurrently releasing its associated snap-out winding form plate to bring its fill-in form section into engagement with the coil group accommodating means to place another preselected turn-gauging step in the path of the wire thereby to develop a coil group in the coil group accommodating means.

Preferably, the method also includes the additional step of inserting the coil group into the slots of an electromagnetic device, such as the stator of a dynamoelectric machine, directly from the coil group accommodating means. Also, the steps of placing the coil group accommodating means is preferably carried out by moving the coil group accommodating means generally in a horizontal direction to place the curved blades of the coil group accommodating means under the snap-out plates which are disposed for movement essentially in a vertical direction.

One important advantage of the present invention is that it is possible to develop the coils of two or more coil groups efficiently in a coil group accommodating means, such as coil injection tooling, using only one coil turn-forming assembly, and then effectively insert the coil groups directly from coil group accommodating means into the slots of a stator core or other slotted structure. Thus, savings in labor, equipment, costs, and time are readily obtained with the present invention as well as a reduction in the tendency of the turns to crossover one another as the coils are being developed into the slots of the slotted structure. Another advantage is that the length of successive wire turns for a coil may be selectively changed as wire turns for such coil are being generated.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

DESCRIPTION OF THE PREFERRED EMBODIMENTS

Figures 1, 2:
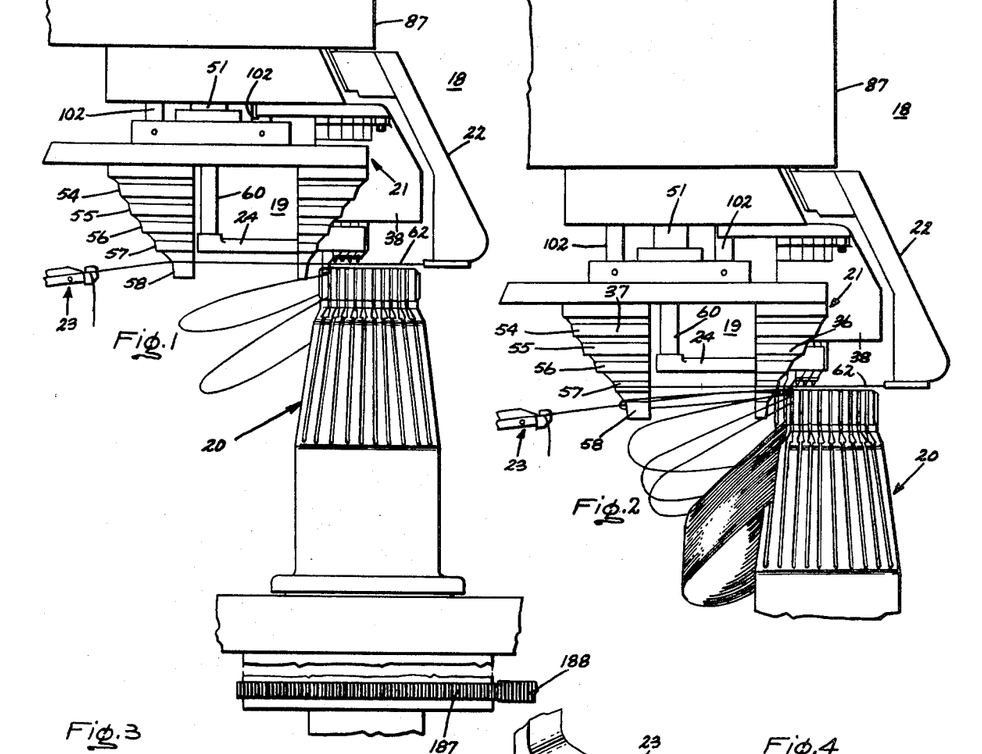
FIG. 1 is a side elevational view of the winding head and coil group accommodating means of an illustrative coil developing apparatus for carrying out one form of my invention and illustrating the non-collapsible coil turn-forming assembly in the initial position for winding a first coil into the coil group accommodating means.
FIG. 2 is a view corresponding to the view shown in FIG. 1 wherein the coil turn-forming assembly is shown with a second turn-gauging step in the path of the wire being wound by the flyer.

Having more specific reference now to FIGS. 1 through 10, I will now describe a coil developing apparatus 18 for carrying out one form of the present invention and more specifically the winding head 19 shown in FIGS. 1 and 2 with a coil group accommodating means or device in the form of coil injection tooling 20 in position under the winding head 19.

The winding head 19 includes a non-collapsible coil turn-forming assembly 21, winding means in the form of a flyer 22, a wire cutter and holder 23 and a stripper 24. In this illustrated embodiment of the invention, the winding head 19 is adapted to generate the turns for a coil group comprising up to five serially connected coils of electrically conductive wire. Each coil may be one or more turns of wire and normally will be several such turns. The coils, as will hereinafter be more fully explained, are formed in the coil group accommodating means 20 as the individual turns are generated on the coil turn-forming assembly 21. As the individual turns are generated they are stripped off the coil turn-forming assembly 21 essentially by the last wound turns forcing the previously wound turns downwardly into one of the five turn-receiving slots 25, 26, 27, 28 and 29 (see FIG. 5) of the coil group accommodating device 20. Also, the stripping of the turns is aided by the force of gravity. The coil receiving slots 25, 26, 27, 28 and 29 are defined by spaced curved blades 30, 31, 32, 33 and 34. A more detailed description of one coil group accommodating device that may be used in conjunction with the winding head 19 is presented in my co-pending application Ser. No. 875,895 assigned to the same assignee as the present application and having an effective filing date the same day as the original parent application Ser. No. 748,406 of the present application.

Figure 5:
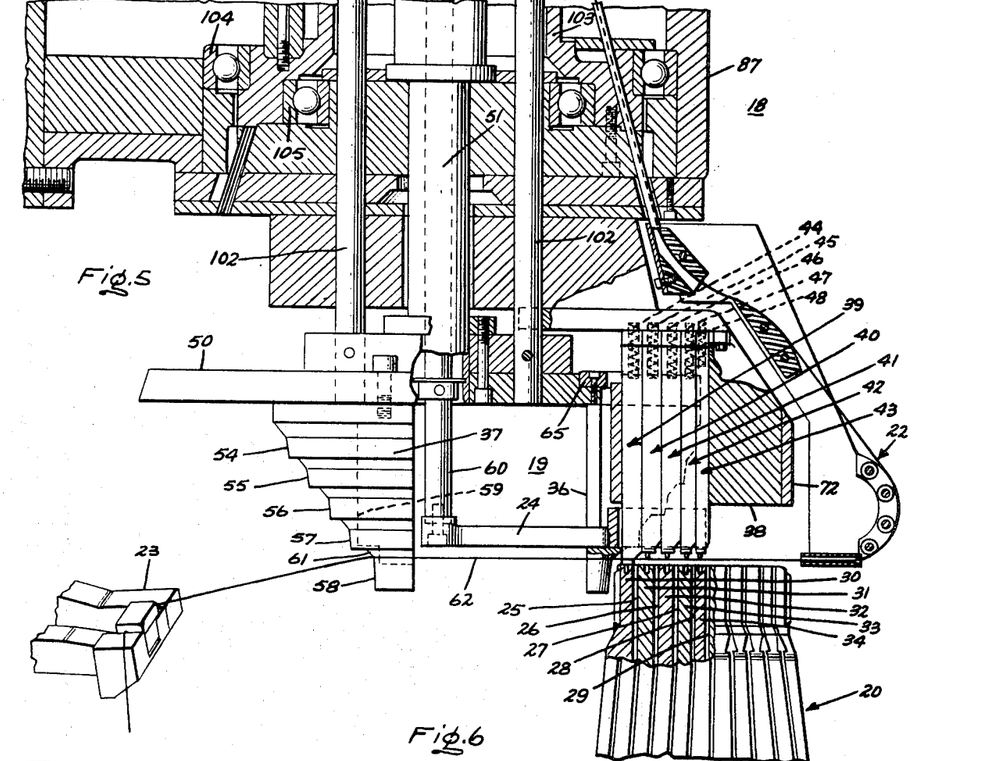
FIG. 5 is an enlarged side elevational view corresponding to the views shown in FIGS. 1 and 2, partially sectionalized to show the various parts thereof.
Figure 6:
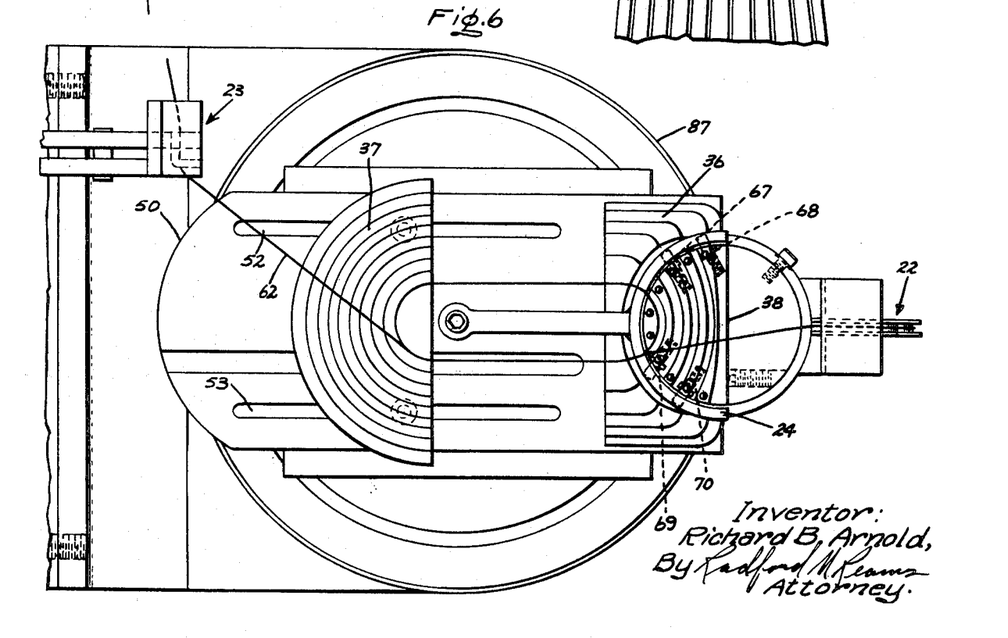
FIG. 6 is a bottom plan view of the coil turn-forming assembly shown in FIG. 5 without any sectionalization of the parts and without the coil group accommodating means being shown.

Coil turn-forming assembly 21 includes a jump form portion 35, with a mid-form section 36 and a back-form section 37, and a snap-out form portion 38. As is best seen in FIG. 5, the snap-out portion 38 includes a plurality of guides or guide means in the form of snap-out winding form plates 39, 40, 41, 42 and 43 which are biased to extended positions (downwardly in FIG. 7) by springs 44, 45, 46, 47 and 48. The back-form section 37 and the mid-form section 36 are supported on a jump plate 50 attached to a jump tube 51. The back-form section 37 is adjustably mounted in two elongated slots 52, 53 (see FIG. 6) of the jump plate 50 so that the back-form section 37 can be moved relative to the mid-form section 36 to allow the coil turn lengths to be adjusted by increasing or decreasing the spacing between the turn-gauging steps 54, 55, 56, 57 and 58 on the back-form section 37 and mid-form section 36. In order to permit the back-form section 37 to accommodate relatively short turn lengths, the back-form section 37 is provided with an opening 59 so that it can pass over the stripper 24 and stripper actuating shaft 60.

In this illustrative apparatus, the mid-form section 36 and back-form section 37 define five turn-gauging steps 54, 55, 56, 57 and 58 which are interrupted at the side of the mid-form section 36 adjacent to the snap-out form portion 38. The turn-gauging steps 54, 55, 56, 57 and 58 are arranged so that the turns for the coil with turns of shortest length are generated initially and turns for coils having greater turn lengths are then successively generated. It will be seen in FIG. 5, that each of the turn-gauging steps 54, 55, 56, 57 and 58 are formed with an adjacent bevel 61 that is approximately 45 degrees in the exemplification of my invention. Also, it will be noted that each of the turn-gauging steps is pitched at a slight angle, preferably in the order of 3 degrees on the mid-form section, to facilitate the downward movement of the turns. The flyer 22 is aligned so that the wire 62 fed by the flyer 22 will strike the bevel 61 of the steps thereby effecting a downward movement that will cause a force to be exerted against any turns previously wound. In this manner the turns are effectively pushed downwardly into the coil receiving slots 25, 26, 27, 28 and 29 of the coil injection tooling 20 or other coil receiving or coil group accommodating device, to develop the coils in the slots. Also, because of the vertical disposition of the steps, the removal of turns from the steps is aided by the force of gravity without need for collapsing any of the winding form components.

The mid-form section 36 differs from the back-form section 38 in that it has a cut-out portion 63 which defines the interruptions in the steps 54, 55, 56, 57 and 58 and accommodates the snap-out winding form portion 38. The mid-form section 36 is also formed with an axially extending opening 64 (see FIG. 10) to accommodate the movement of the stripper 24 and stripper actuating shaft 60.

As is best seen in FIG. 5, a trip plate 65 is located at the top of the mid-form section 36, and as the mid-form section 36 is lowered, it successively engages the four latch pawls 67, 68, 69 and 70 (see FIGS. 6 and 7) to release the snap-out winding form plates 40, 41, 42 and 43. The first snap-out winding plate 39 does not have a latch pawl release but is spring-biased into position when the jump tube 51 positions the first turn-gauging step 54 in the path of the wire 62.

Referring more specifically to FIGS. 5 through 9, I will now specifically describe the various parts of the snap-out form portion 38 of the non-collapsible coil turn-forming assembly 21. It will be appreciated that the snap-out form portion 38 does not move with the jump plate 50. The snap-out form portion 38 includes a housing 72 and the five snap-out winding form plates 39, 40, 41, 42 and 43. As will be seen in FIG. 9, the snap-out winding form plate 43 has a pair of spaced pins 73 and 74 that engage mating holes 75 and 76 formed on the top of curved blade 34 of the coil injection tooling 20. It will be seen that the snap-out winding plate 43 has a fill-in form section 77. When the coil turn-forming assembly 21 has been located or jumped to the position where turn-gauging step 54 is in the path of the wire 62 being wound, winding plate 43 is released from its latched position and will be extended by the associated springs 48 to place the fill-in form section 77 in the interruption of the mid-form 36 and in the path of the wire 62.

Figure 9:
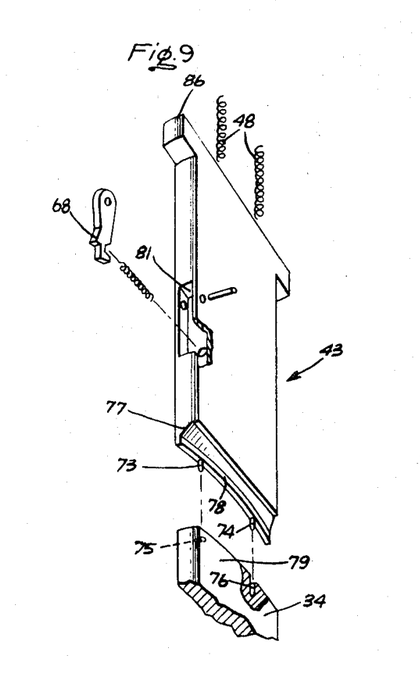
FIG. 9 is a view in perspective of a snap-out plate with the latch pawl mechanism shown in an exploded view.
Figure 10:
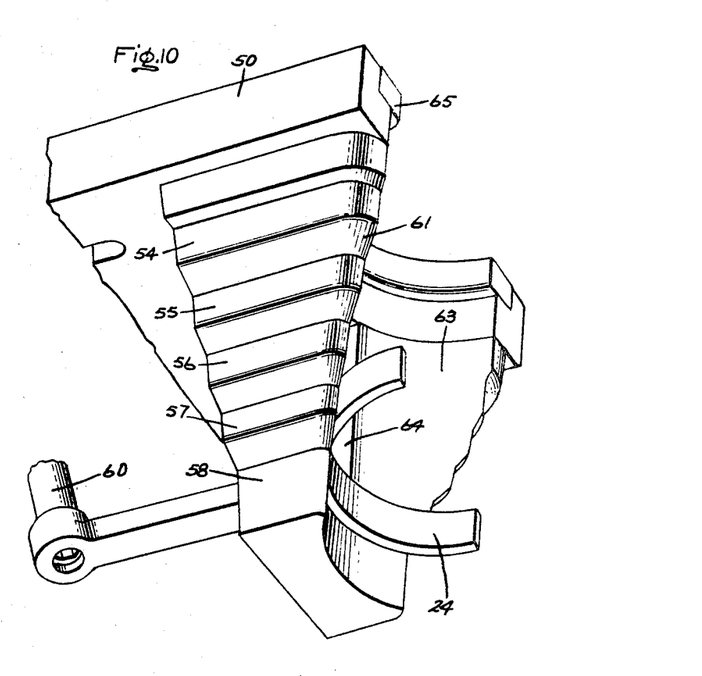
FIG. 10 is a view in perspective of the midform section of the coil turn-forming assembly and the stripper.

When the pins 73, 74 are engaged with the blade 34, the curved surface 78 on the fill-in form section 77 mates with the adjacent curved surface 79 of the blade 34 to provide a smooth passage for the entry of wire 62 into the coil injection tooling 20. Thus the snap-out form plates, and particularly their fill-in form portions, provide guides or guide means for leading the generated turns into the coil injection tooling.

Figure 7:
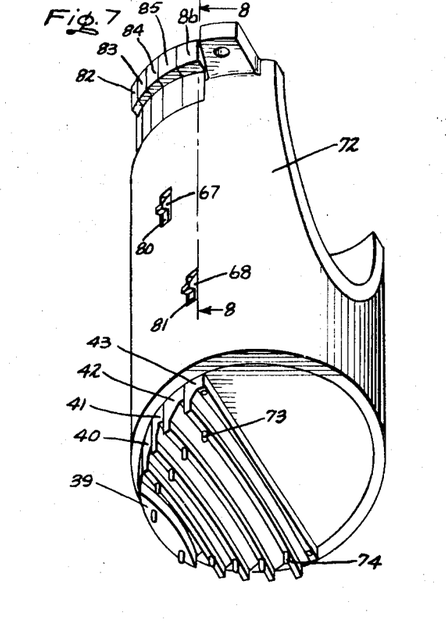
FIG. 7 is a view in perspective of the snap-out form portion of the coil turn-forming assembly.

As is seen in FIG. 7, the pawls 67, 68 are latched in the openings 80, 81 formed in the snap-out winding form housing 72. The other two pawls 69, 70 are on the back side of the housing 72 and cannot be seen in the view of FIG. 7. The four pawls 69, 67, 70 and 68 are positioned at preselected vertical points so that when the turn-gauging steps 55, 56, 57 and 58 are successively positioned in the path of the wire 62 being wound, the latch pawls 69, 67, 70 and 68 are successively tripped to place the snap-out winding form plates 40, 41, 42 and 43 respectively in their extended positions.

In this manner, turn-gauging steps 54, 55, 56, 57 and 58 and corresponding snap-out winding form plates are successively brought into the path of the wire being wound. Each set of a turn-gauging step and snap-out winding form plate, particularly the fill-in form section, provide a form for generating the turn of wire for a particular coil.

It will be seen in FIG. 7 that the snap-out winding form plates 39, 40, 41, 42 and 43 are formed with lugs 82, 83, 84, 85 and 86. When the mid and back form sections 36, 37 of the coil form assembly 21 are returned to their initial positions after the coils for a coil group are developed, the lugs 82, 83, 84, 85 and 86 are engaged by the trip plate 65, and the snap-out winding form plates 39, 40, 41, 42 and 43 are returned to their retracted positions. The snap-out winding form plate 39 is held in its retracted position by trip plate 65 while winding form plates 40, 41, 42 and 43 are latched in their retracted positions by engagement of latch pawls 69, 67, 70 and 68 with housing 72. It will be appreciated that the snap-out portion housing 72 is bolted to the drive control housing 87.

Figure 8:
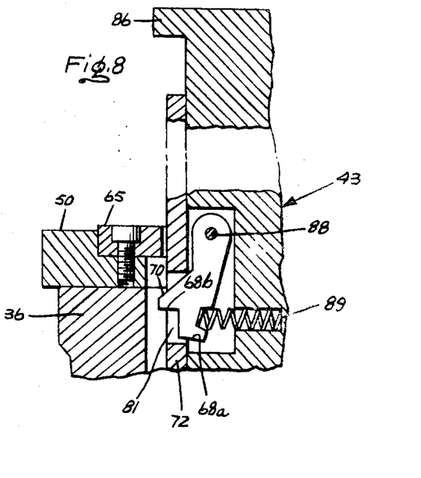
FIG. 8 is a partial sectional view through one of the snap-out winding form plates and through a portion of the snap-out form portion housing, illustrating the latch pawl mechanism of the snap-out winding form plates.

In FIG. 8 I have shown a fragmentary sectional view of the trip plate 43, the jump plate 50, the mid-form section 36, the trip plate 65, and snap-out housing 72 to illustrate the interrelationships of these parts. It will be seen that the latch pawl 68 is pivotally supported on a pin 88 and is biased outwardly into engagement with the opening 81 of the snap-out portion housing 72 by a spring 89 when the snap-out plate 43 is in the latched position. When the mid-form section 36 is lowered, trip plate 65 engages the latch pawl 68 to force its lower edge 68a out of engagement in the opening 81 of the snap-out portion housing 72 thereby unlatching the snap-out winding form plate 43. The winding form plate 43 then is extended by springs 48 until latch pawl arm 68b engages the edge of opening 81. When the mid-form section 36 is returned to its initial position upon the completion of the winding of the coils of a coil group, the trip plate 65 will engage the lugs 86 to return the snap-out plate 43 to its latched position.

In a similar manner the snap-out plates 40, 41 and 42 are unlatched when the trip plate is lowered sufficiently to engage latch pawls 69, 67 and 70. As the mid-form section is returned to its initial position, the trip plate 65 will engage the lugs 83, 84 and 85 to raise the snap-out plates 40, 41 and 42 to their latched positions. The trip plate 65 also will engage lugs 82 to move the snap-out plate 39 from the coil injection tooling.

Figures 3, 4:
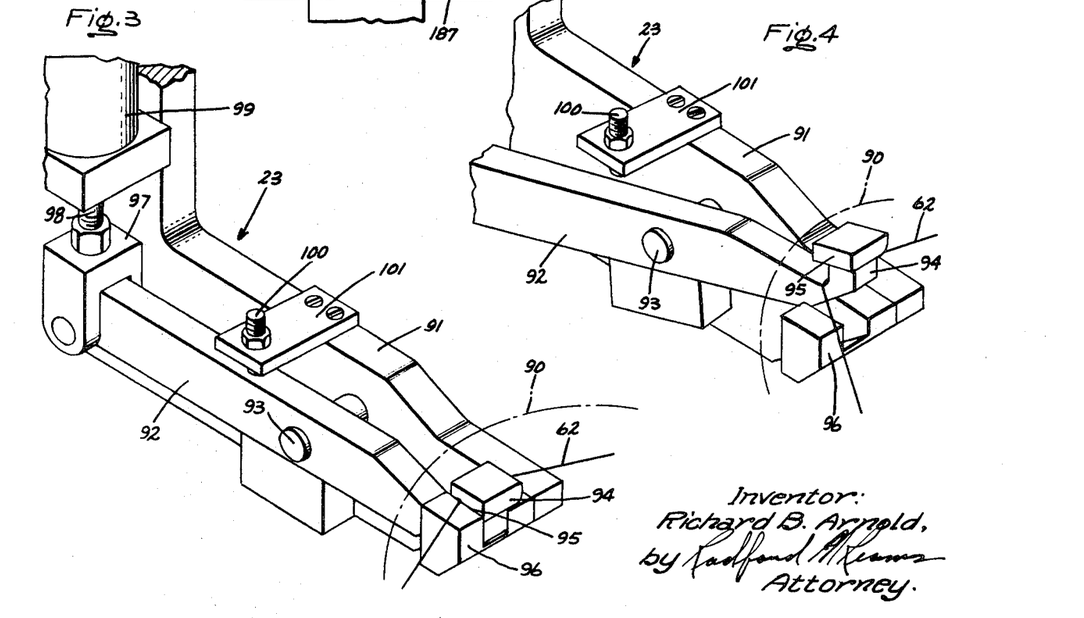
FIG. 3 is an enlarged perspective view of the wire cut-off and holding device shown in the hold position.
FIG. 4 is an enlarged fragmentary view shown in perspective corresponding to the view shown in FIG. 3 wherein the wire cut-off and holding device is shown in the open position.

Referring now to FIGS. 3 and 4, I will now more fully describe the wire cutter and holder 23. In the views illustrated therein, the flyer path is indicated by the broken line 90. As viewed in FIGS. 3 and 4, the right!-hand portion of the wire 62 extends to the flyer 23, while the left-hand portion of the wire 62 is either a termination portion or extends to the last previously developed coil.

The function of the wire cutter and holder 23 is to hold and cut the wire 62 at preselected points in the winding cycle. The wire cutter and holder 23 includes a support bracket 91, a hook arm 92 pivotally supported by a pin 93 attached to the bracket 91. At one end the hook arm 92 is formed with a hook 94 for engaging the wire 62. The hook 94 includes a cutting edge 95 and when engaged in the cutting block 96 as illustrated in FIG. 3, cutting edge 95 will shear the wire 62. The hook arm 92 is connected at its other end to a clevis 97 attached to the rod 98 of a double-acting pneumatic cylinder 99.

In order to permit adjustments to be made in the holding pressure applied to the wire 62, an adjusting screw 100 is provided. The adjusting screw 100 is supported over the hook arm 92 by means of a plate 101 attached to the bracket 91.

From the above description of the winding head 19, the flyer 22, and wire cutter and holder 23, it will be apparent that certain control functions must be carried out to effect the jumps or movements of the jump form portion 35 in proper sequence, to drive the flyer 22, to operate the wire cutter and holder 23, and to actuate the stripper 24 upon completion of a winding operation. A winding control and drive that is suitable for this purpose is described in U.S. Pat. No. 3,514,837 which issued from application Ser. No. 826,744 filed on Apr. 2, 1969; which application in turn was a continuation-in-part application of application Ser. No. 594,462 filed on Nov. 15, 1966; and which is assigned to the same assignee as the present invention.

Having more specific reference now to FIGS. 5, 6, 11 and 12, I will now more fully explain and describe the control and drive for the winding head 19. The stepped vertical movement is imparted to the winding head 19 by the jump tube 51 attached to the jump plate 50. A pair of vertically extending guide rods 102 prevent any rotational movement of the coil form assembly 21. The winding flyer 22 is driven by a spindle 103 which is supported for rotation within the drive and control housing 87 by means of the ball bearings 104 and 105.

Figure 11:
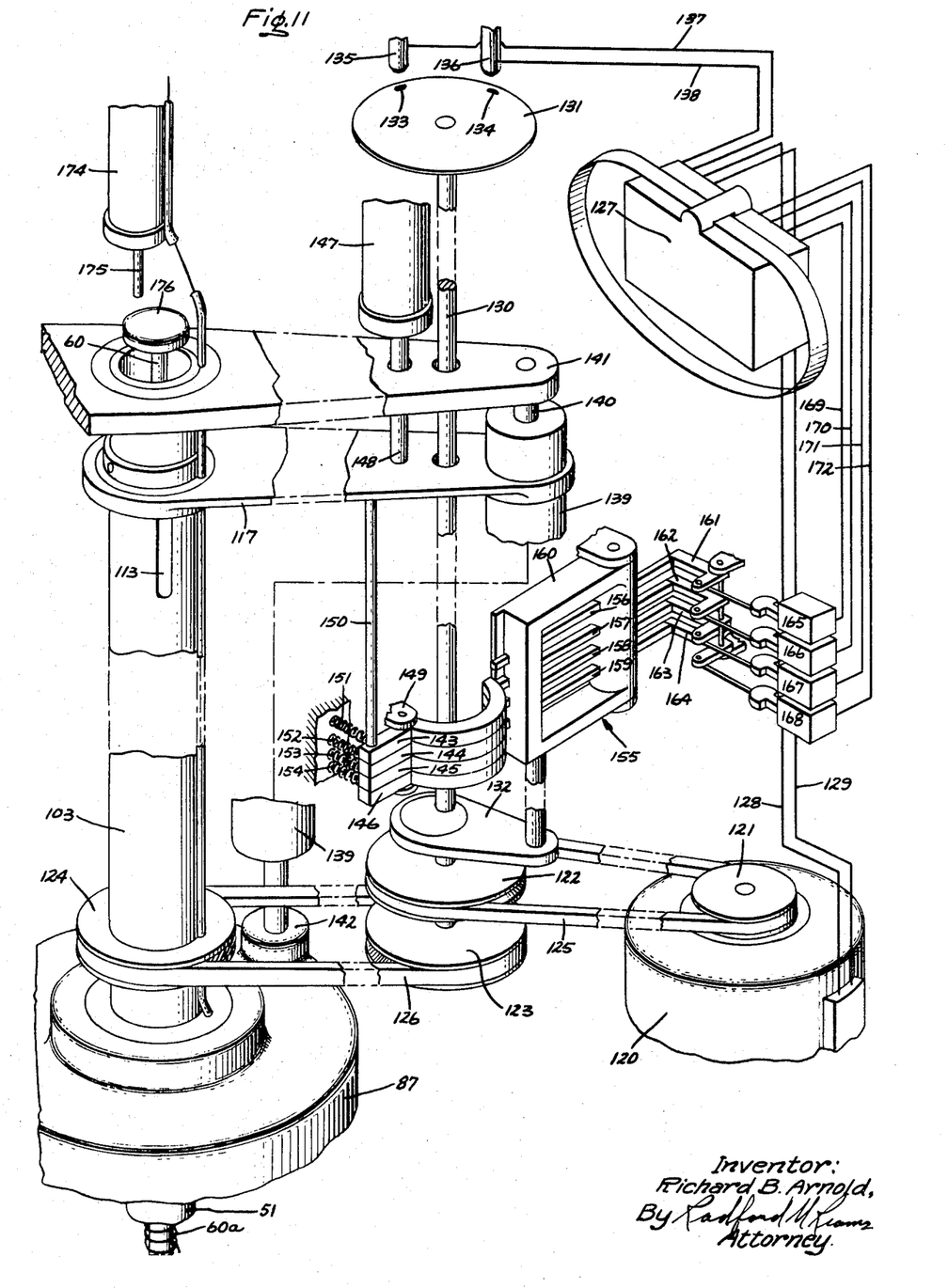
FIG. 11 is a simplified schematic diagram in perspective of the drive and control assembly.
Figure 12:
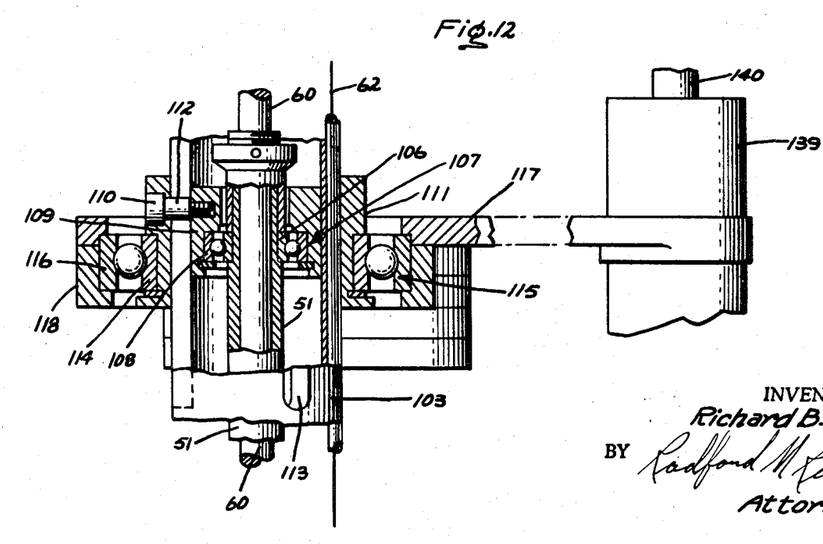
FIG. 12 is a sectional view of the jump arm assembly illustrating how translational movement is imparted to the jump tube.

It will be seen in the schematic diagram shown in FIG. 11 that the jump tube 51 and the stripper actuating shaft 60 extend through the flyer spindle 103. The stripper actuating shaft 60 is biased in the upward position as shown by a spring 60a. Near the top end of the jump tube 51 and inner race 106 of a ball bearing 107 (see FIG. 12) is secured to the jump tube 51, and the outer race 108 of the ball bearing 107 is attached to an inner sleeve 109. The cap screws 110 connect an outer sleeve 111 with the inner sleeve 109 for rotation with spindle 103. Each cap screw 110 has a shank portion 112 engaged in longitudinally extending slots 113 formed in the flyer spindle 103. It will be noted that the inner race 114 of a second ball bearing 115 is attached to the outer sleeve 111. The outer race 116 is secured to a jump push or yoke plate 117 by an annular retainer 118. With this arrangement it will be appreciated that the jump push or yoke plate 117 can effectively impart a longitudinal movement to the jump tube 51 while the spindle 103 rotates around it. In this illustrative embodiment of my invention, the winding flyer spindle 103 is driven by an electric motor 120 in a one-to-one speed ratio through a pulley system. The pulley system includes pulleys 121, 122, 123 and 124 and belts 125, 126.

The motor 120 is connected to a tape reader 127 by means of the leads 128 and 129. Pulley 122 driven by the motor 120 drives a control shaft 130 which rotates a transparent disc 131 and an eccentric arm 132. Light-impervious mark 133, 134 on the disc 131 interrupt the light from photoelectric cells 135, 136 to provide signals to tape reader 127 indicative of the position of the flyer and the number of revolutions traversed by the flyer. Leads 137 and 138 connect the photoelectric cells 135 and 136 in circuit with the tape reader 127.

It will be noted that the yoke plate 117 is attached to a cylindrical guide member 139 slidably disposed along the rod 140 for limiting the movement of the yoke plate 117 from an upper position where it butts against the support bracket 141 and a lower position where it rests against the shoulder 142. The stepped movement of the jump tube 51 is controlled by a series of four trip bars 143, 144, 145 and 146. A double-acting air cylinder 147 having a rod 148 attached to the yoke plate 117 normally during winding biases the yoke plate 117 in a downward direction. The trip bars 143, 144, 145 and 146 are pivotally supported on a bracket 149 and are normally held in a hold position for engagement with the yoke plate extension 150 by springs 151, 152, 153 and 154. The trip bars 143, 144, 145 and 146 are moved out of the hold position by means of an oscillating mechanism 155 having four pins 156, 157, 158 and 159 which are movably carried in a rocker arm 160 driven by the eccentric arm 132. Bell cranks 161, 162, 163 and 164 operatively connected to solenoids 165, 166, 167 and 168 move a pin under its associated trip bar whenever a solenoid is energized. The solenoids 165, 166, 167 and 168 are connected with the tape reader 127 by means of the electrical leads 169, 170, 171 and 172. When a pin is extended and engages a trip bar, the trip bar will pivot out of the stop position, and the yoke plate 117 will jump or move into engagement with the next trip bar. It will be appreciated that so long as the pins 156, 157, 158 and 159 remain in their retracted positions, the oscillatory movement of the eccentric arm 132 does not have any effect on the trip bars, since the pins make no contact with the bars.

In order to insure that all the turns have been moved off the turn-generating forms upon completion of the turn-generating operation, the stripper 24 is actuated by an air cylinder 174. A rod 175 of the air cylinder 174 is actuated in response to a signal from the tape reader 127 and strikes a strike plate 176 attached to the stripper shaft 60 and moves the stripper 24 downwardly. As the stripper 24 moves in the downward direction, the spring 105 is compressed, and the strike plate 176 and stripper 24 are returned to their initial positions by means of the spring 105 when the coil turn stripping operation is completed.

Figure 13:
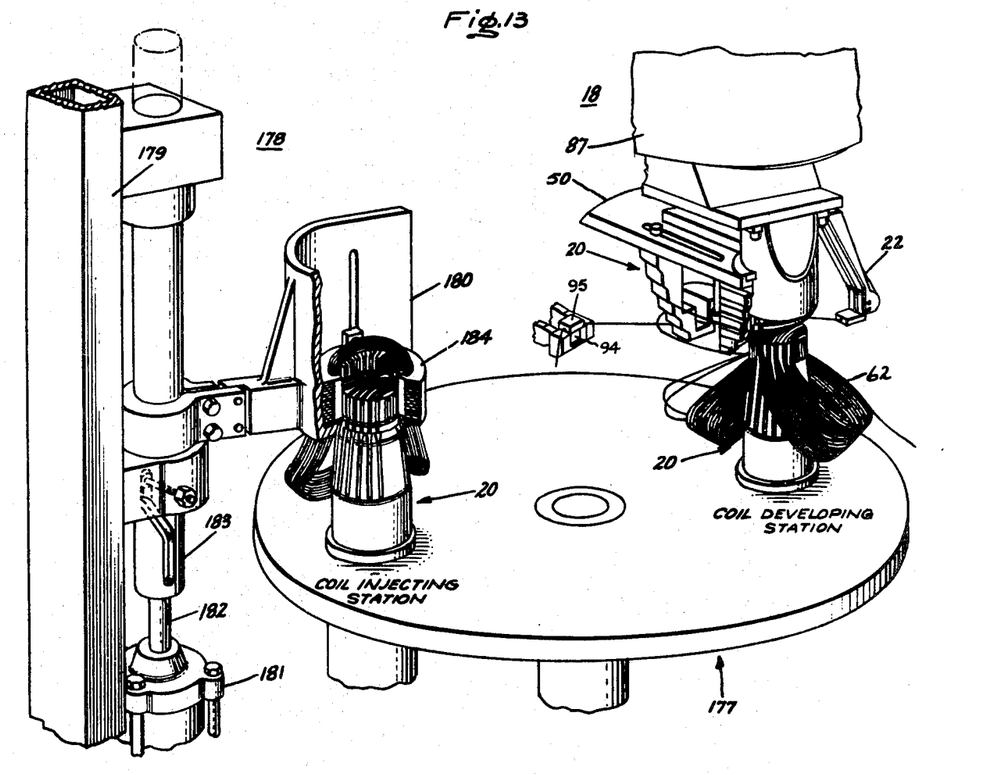
FIG. 13 is a view in perspective of a machine wherein the improved apparatus is mounted on a turntable to illustrate how the coil group accommodating means with the coil groups wound thereon can be indexed to a coil injecting station where the coil groups are axially inserted directly from the coil group accommodating means into the slots of a stator core.

In FIG. 13 I have illustrated a coil developing apparatus 18 as applied to a turntable 177 with the winding and coil injecting stations being shown. After the first coil group is developed, the coil injection tooling is rotated 180 degrees by the gears 187, 188 (see FIG. 1) to place the other set of turn receiving slots under the snap-out plates 39, 40, 41, 42 and 43. When the second coil group is developed by the apparatus 18, the turntable 177 is indexed to place the coil injection tooling 20 with the two coil groups in position at the coil injection station while the other coil injection tooling is moved over to the winding station.

The coil injection tooling 20 is illustrated with the longitudinal axes of the curved blades 30–34 disposed generally vertically and with the coil turn-forming assembly 21 positioned above the coil injection tooling. Such an arrangement is not necessary and other dispositions of these parts can be utilized. It will be realized that, to obtain any substantial assistance from the force of gravity in moving generated turns into the turn receiving slots, the coil accommodating device should be positioned, at the coil developing station, with the longitudinal axes of the curved blades nonhorizontal and with the distal ends of the blades positioned generally upward.

At the coil injecting station, a core clamping and positioning assembly, generally identified by reference numeral 178 is provided. The core clamping and positioning assembly 178 includes a main vertical frame 179, a clamping arm 180, a double-acting cylinder 181 having a rod 182 attached to a cylinder cam 183. As will be seen in FIG. 13 the rectilinear motion of the rod 182 is converted by the cylinder cam 183 on which the clamping arm 180 is supported to requisite vertical and horizontal movements necessary to lift a stator 184 clamped in the clamping arm 180 from juxtaposition to coil injection tooling 20 and to swing the arm 180 angularly away from the turn-table 177, when the arm 180 is axially removed from the coil injection tooling, where the stator 184 can be conveniently removed by an operator.

Having more specific reference now to FIGS. 1, 2, 5, 11 and 13, I will now more fully describe a cycle of operation of the improved coil developing apparatus 18 for carrying out one form of the method of the present invention to develop a coil group.

When the coil injection tooling 20 is located in position under the coil turn-forming assembly 21, the jump cylinder 147 positions the push plate 117 so that the extension 150 butts against the first trip bar 143. This causes the first snap-out winding form plate 39 to be engaged by spring pressure against the first curved blade 30 of the coil injection tooling 20 and the first turn-gauging step 58 to be positioned in the path of the wire 62. The flyer 22 now starts rotating to generate turns of wire on the first turn-gauging step 54, including the fill-in form portion of winding form plate 39. After approximately three turns are generated, the start end of the wire 62 can be released from the wire cutter and holder 23. The number of turns generated about the first turn-gauging step 54 of the coil turn-forming assembly 21 is determined by the punched tape of the tape reader 127. As the turns of wire are generated around the turn-gauging step 54, including the snap-out winding form plate 39, they tend to slide downwardly (as seen in FIG. 1) and enter the turn-receiving slot 25. The first coil is actually formed in the turn-receiving slot 25.

With the turn count for the first coil completed, the pin 156 is extended by solenoid 115 to cause the push plate 117 to engage the second trip bar 144. The second snap-out winding form plate 40 is now unlatched, and the second turn-gauging step 55 is in the path of the wire 62. The second snap-out winding plate 40 is held against the curved blade 31 of the coil injection tooling 20 by spring pressure. Also, the pair of pins at the end of the second snap-out winding form plate 40 are engaged in the mating holes in the curved blade 31 to maintain the second snap-out winding form plate 40 rigidly in alignment therewith. When the predetermined number of turns have been generated to complete the second coil in coil receiving slot 26 of the coil injection tooling 20, solenoid 166 is energized by the tape reader to cause trip pin 157 to be extended. The extension 150 of the push plate 117 engages the third trip bar 145 thereby causing the jump form portion 35 to be lowered and unlatch the third snap-out winding form plate 41.

Similarly, after a predetermined number of turns have been generated to complete the winding of the third coil, solenoid 167 is energized by the tape reader 127 to cause the extension 150 of push plate 117 to engage the fourth trip bar 146. The turn-gauging step 57 with the fourth snap-out winding form plate 42 is now in the path of the turns generated from the wire 62, and the turns for fourth coil of the coil group are generated.

Upon completion of the fourth coil, solenoid 168 is energized by the tape reader 127 to effect the fifth jump and place the fifth turn-gauging step 58 and its associated snap-out winding form plate 43 in the path of the wire 62 being wound by the flyer 22 thereby to generate the turns for the fith and last coil of the coil group. It will be appreciated that as the flyer 22 rotates around a turn-gauging step, the wire 62 is laid on the bevel 61 of a turn-gauging step. Thus, each turn of wire as it is placed on the winding form by the flyer pushes the preceding turns into the coil receiving slots of the insertion tooling 20. Also with the nonhorizontal positioning, gravity assists in moving the turns into the slots 25–29.

Thus, snap-out winding form plates 40, 41, 42 and 43 are successively unlatched as the jump form portion 35 is lowered to place the progressively larger turn-gauging steps 55, 56, 57 and 58 in the path of the wire 62. In the exemplification of the invention, the tape reader 127 not only controls the turn count of the coils being developed but also preferably controls the number of the slow down turns included at the end of the total turn count for the fifth coil. It will be appreciated that a slow down of the flyer speed is required in order to allow the wire cutter and holder 23 to be brought into the wire path during the last turn and also to permit control of the wire location. A signal indicating the rotational position of the flyer head is provided by means of the tape mark 134 on the translucent disc 131. Also, at the end of the total turn count of the fifth coil, the wire stripper 24 is actuated by the stripper air cylinder 174, and not only clears the coil turn-forming assembly 21 of any turns that may not have moved off but also pushes the turns into the coil turn receiving openings of the coil injection tooling 20 sufficiently so that they will not spring out.

After the first group of coils have been developed in the tooling (the first group of coils being the first pole of a two pole stator in this illustration of the invention), the snap-out winding form plates 39, 40, 41, 42 and 43 are returned to their retracted positions. The coil injection tooling 20 is then indexed into position by rotating it 180 degrees to receive the turns for the coils of the second pole. The turns for the coils of the second pole are generated in essentially the same sequence as the coils of the first coil group and are received in appropriate slots in the coil injection tooling to develop the coils. When the coils of the second coil group are wound and the coil turn forming assembly 21 and the stripper 24 moved to their initial positions, the coil injection tooling, containing the two coil groups is moved to an injection station, as shown in FIG. 13, where the coil groups are axially inserted into the slots of the stator 184.

From the foregoing description it will be apparent that, as the turns of each coil are being generated, they are transferred directly into the coil injection tooling so that each coil is developed in the coil injection tooling. This provides the important advantage that the coils can now be directly inserted into a stator core of an electric motor using only one coil form assembly and one coil injection tooling. Further, unlike with prior art methods, there is little tendency for the turns to become jammed or crossed-over as the turns are being deposited into the tools, thereby reducing if not entirely eliminating potential interference with a subsequent smooth transfer of the turns from the tools into selected slots of a magnetic core. Other benefits result from a short period of time employed for the combined developing and injecting operations permitted by the present invention, the lack of need for collapsible winding arbors, which correspond in number to the magnetic poles of the core, and the usual related inherently expensive components, and the high level of production efficiency attainable using the present invention.

Although in the illustrated exemplifications of my invention, I have described a method for developing the coil groups of a two pole stator, it will be appreciated that the improved coil developing method is readily adapted for developing windings for magnetic cores having in excess of two poles. For instance, when the coil developing method is used to wind four coil groups into coil injection tooling, the tooling is sequentially rotated or turned three times through 90 degrees to locate the tool at the proper position for receiving the turns of the coil groups. In addition, although a latching arrangement for releasing five snap-out winding form plates was illustrated, it will be understood that, depending upon the number of coils to be wound, more or less than five snap-out winding form plates may be employed.

Further, if desired the individual wire turn lengths in a given coil may be readily varied merely by gradually or progressively changing the distance between winding forms in the non-collapsible form assembly as the turns are being developed into coils in the tool. For instance, this may be accomplished by moving back-form 37 gradually toward or away from mid-form 36 by a screw feed or the like. Thus, by regulating movement and direction of the feed, the turns may be progressively shortened, lengthened or both in the same coil, as dictated by the slot configuration of the magnetic core during coil development in the tools or other slotted coil group accommodating member.

Figure 14:
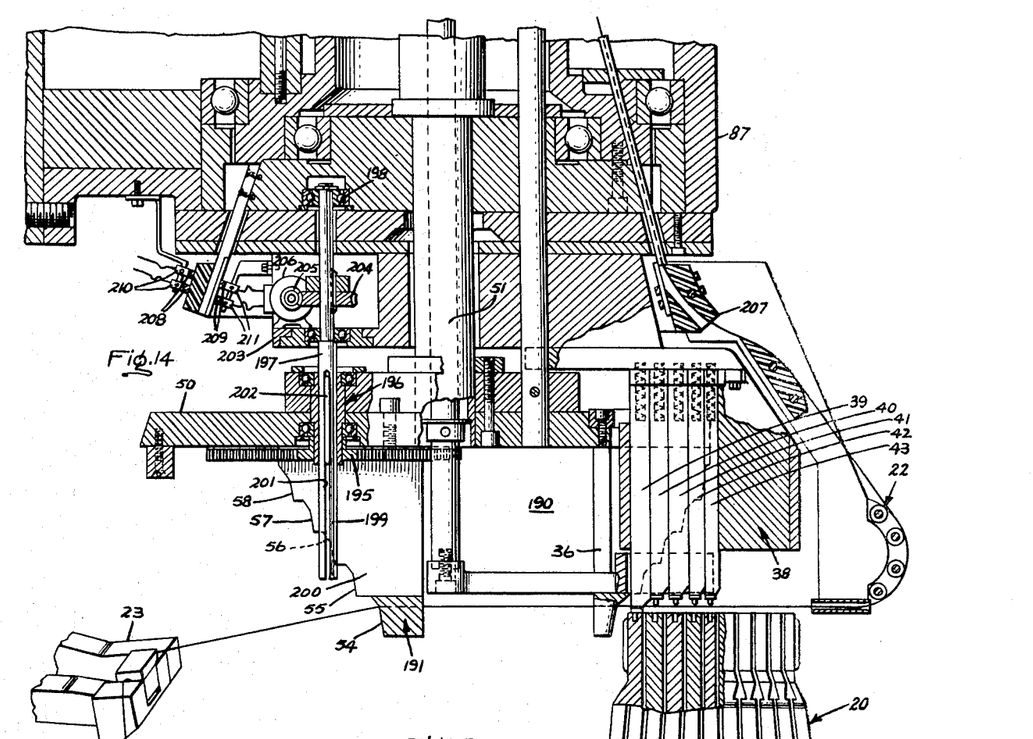
FIG. 14 is an enlarged side elevational view similar to FIG. 5, but illustrating another coil turn-forming assembly adapted for carrying out the method of this invention, in which the back-form section is movable relative to the snap-out winding form portion during turn generation.
Figure 15:
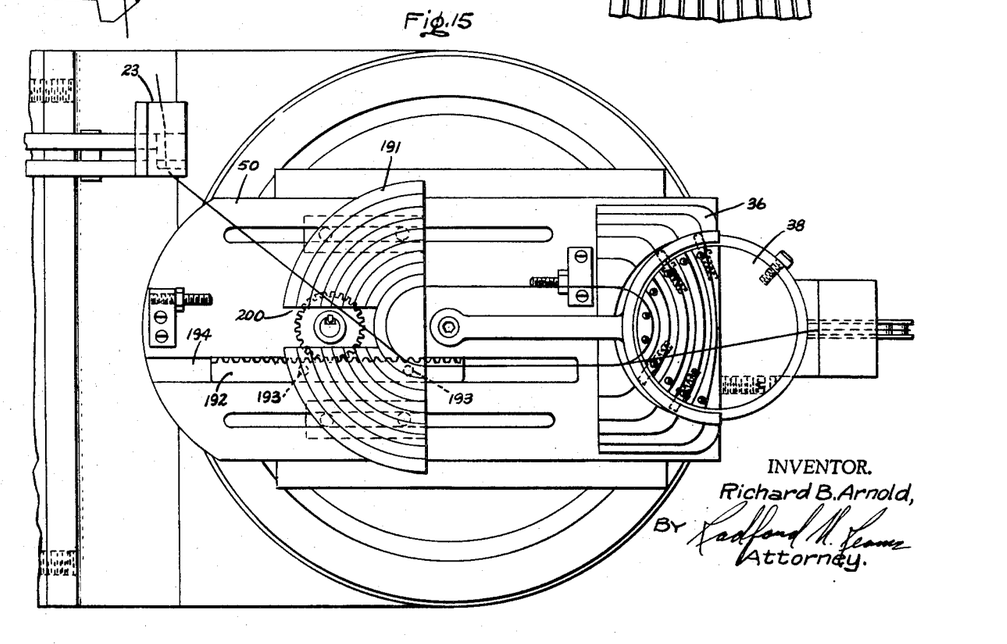
FIG. 15 is a bottom plan view of the coil turn-forming assembly shown in FIG. 14 without any sectionalization of the parts and without the coil group accommodating means being shown.

Referring now to FIGS. 14 and 15 in particular, there is illustrated certain details of an illustrative coil turn-forming assembly 190 which is basically similar to the coil turn-forming assembly 21, of FIGS. 1-13, but has been modified somewhat in order to practice a form of the method in which the length of the turns being generated is selectively varied for a predetermined coil of coils. The snap-out form portion 38 is the same, and the mid-form section 36 of the jump form portion is the same; however, the back-form section 191 has been modified. A rack 192 is attached to the back-form section 191 by some suitable means such as small bolts 193, and the rack is received in a slot 194 in the jump plate 50. A pinion gear 195 is supported on the jump plate 50 by means of a bearing structure 196 and has teeth meshing with the teeth of the rack 192. Thus, as the pinion gear 195 is rotated in opposite directions, it will move the rack to the right or the left (as seen in FIGS. 14 and 15) and the rack will carry the back-form section 191 with it.

In order to selectively rotate the pinion gear, and thus move the back-form section, a shaft 197 is provided with its upper end mounted in the drive control housing 87 by a bearing structure 198. The lower end 199 of the shaft is received in a slot 200 in the back-form section and includes a longitudinally extending keyway 201. The keyway cooperates with an elongated key 202 formed in the bearing 196 so that as the shaft rotates the bearing 196, and thus pinion gear 195, will be rotated. The jump tube 51 can move the coil turn-forming assembly 190 longitudinally (up and down in FIGS. 14 and 15) without moving the shaft 197 longitudinally as the key 202 and keyway 201 are relatively movable in their axial direction. Within the drive control support structure 203, the shaft is connected to a warm gear 204 and the warm gear in turn is connected to the drive shaft 205 of a small electrical motor 206. The motor is mounted to a stationary portion of the support structure 203.

In order to provide electrical energy to the motor, the flyer mechanism 22 includes a rotary sleeve 207 having a first set of slip rings 208 provided on its outer surface and a second set 209 provided on its inner surface, these slip rings being electrically interconnected through the sleeve. A pair of brushes 210 are mounted in engagement with the outer slip rings 208 and may be connected to a suitable source of electrical energy while a second set of brushes 211 are connected to the inner slip rings 209 and are also connected to the motor 206. Thus at appropriate and predetermined times the motor 206 may be energized to rotate the shaft 197 and thus the pinion gear 195. This rotary motion of the pinion gear is translated to rectilinear motion of the rack 192 which carries with it the back-form section 191.

As the back-form section 191 moves to the right or left (as seen in FIGS. 14 and 15), the distance between its turn-gauging steps 54–58 and the corresponding snap-out winding form plates 39–43 is varied. This effectively varies the circumference of the form about which the turns of wire are being generated and thereby selectively varies the length of successive turns. Since the shaft 197 may be rotated independently of the remaining portion of the turn-forming assembly 190, the spacing may be varied during a turn-generating operation and thus vary the length of successive turns generated for an individual coil. Motor 206 also may be utilized to move back-form section 191 before a turn-generating operation begins so as to set different coil lengths for the turns of successively generated coil groups.

It will be realized that when the back-form section 191 is moved to the left (as seen in FIGS. 14 and 15) during the turn generation to increase the length of successively wound turns, care must be taken both as to the speed which the back-form section is moved and the pitch of the turn-gauging steps to insure that previously generated turns will move off of the turn-generating assembly into associated turn receiving slots of the injection tooling and will not bind on the turn-gauging steps.

While the invention has been explained by describing various embodiments thereof, it will be apparent that many modifications may be made without departing from the spirit of the invention. It is therefore intended to cover all such equivalent variations as come within the scope of the appended claims.

What I claim as new and desire to secure by Letters Patent of the United States is:

1. A method of developing in coil injection tooling having elongated, spaced apart blades forming turn receiving slots therebetween at least one coil of electrically conductive wire, and injecting the at least one coil of electrically conductive wire into preselected coil receiving slots of a magnetic core directly from the coil injection tooling; said method comprising: positioning the coil injection tooling with at least one blade in alignment with at least one guide of a coil turn-forming assembly; generating turns of wire about the coil turn-forming assembly; guiding individual turns into at least one of the turn receiving slots during the turn-generating operation for developing the at least one coil directly in the coil injection tooling and subsequently injecting the at least one coil directly into preselected coil receiving slots of the magnetic core from said coil injection tooling.

2. A method as set forth in claim 1 including the step of selectively varying the length of successive turns during turn generation.

3. A method as set forth in claim 1 wherein additional blades of the coil injection tooling are successively positioned in alignment with corresponding additional guides of the coil turn-forming assembly during the turn-generating operation for forming directly in the coil injection tooling a plurality of interconnected coils of conductive wire.

4. A method of developing at least two distributed coil groups each including a plurality of coils of electrically conductive wire in preselected coil receiving slots of a magnetic core adapted to receive at least two of the distributed coil groups, the method comprising: generating turns for a first distributed coil group about a coil turn-forming assembly and guiding the turns into a first portion of a coil insertion tooling during the turn-generating operation; rotating the coil insertion tooling through a predetermined angle, generating turns for a second distributed coil group about the coil turn-forming assembly and guiding the turns into a second portion of the coil insertion tooling during the turn-generating operation; and thereafter inserting at least said first and second distributed coil groups from said coil insertion tooling directly into preselected coil receiving slots of the magnetic core.

5. A method of developing, in a coil group accommodating device, at least one coil of electrically conductive wire, said method comprising: positioning a coil turn-forming assembly, having at least one snap-out winding form plate and at least one corresponding turn-gauging step adjacent a coil group accommodating device, then positioning the at least one plate and the at least one step such that they are aligned and the at least one plate is engaging the accommodating device adjacent a turn receiving slot in the coil group accommodating device; generating turns of wire for the at least one coil about the turn-gauging step and snap-out winding form plate; and receiving generated turns in the turn receiving slot during the turn-generating operation for developing the at least one coil directly in the turn receiving slot.

6. A method as set forth in claim 5 wherein: relative motion is selectively provided between the turn-gauging step and the snap-out winding form plate during the turn-generating operation for selectively varying the lengths of successive turns.

7. A method as set forth in claim 5, further comprising: successively positioning additional snap-out winding form plates in alignment with corresponding turn-gauging steps and engaging the coil group accommodating means adjacent additional turn receiving slots; generating turns of wire about such corresponding turn-gauging steps and snap-out winding form plates; and receiving such generated turns in the corresponding turn receiving slot during such turn-generating operations.

8. Method for developing in a coil group accommodating device at least one coil group comprising a predetermined number of serially connected coils of electrically conductive wire by winding the wire around turn-gauging steps of a coil turn-forming assembly, the coil group accommodating device including a plurality of blades defining turn receiving slots and the coil turn-forming assembly including a jump form portion having turn-gauging steps with interruptions formed therein and also including a snap-out form portion having a plurality of plates, each of the plates having a fill-in form section for cooperating with an associated interruption of one of the turn-gauging steps, said method comprising: positioning the blades defining the turn receiving slots for the at least one coil group in alignment with the associated fill-in form sections of the plates; locating a first turn-gauging step in the path of wire and concurrently extending a first plate to place its fill-in section in the path of the wire and in the interruption of the first turn-gauging step; generating a predetermined number of turns of the wire about the first turn-gauging step and first fill-in section to form the first coil; receiving the generated turns in a corresponding turn receiving slot during the turn-generating operation; and repeating said locating, extending and generating operations to place a preselected number of the remaining turn-gauging steps and associated fill-in form sections successively in the path of the wire until all the coils of the at least one coil group are developed directly in the coil group accommodating device.

9. The method set forth in claim 8 wherein said method also includes rotating the coil group accommodating device to position blades defining the turn receiving slots for a second coil group in alignment with the associated fill-in sections and repeating said locating, extending and generating steps until all the coils of a second coil group are developed directly in the coil group accommodating device.

10. A method as set forth in claim 4 wherein the lengths of selected successive turns of at least one of the distributed coil groups are varied by providing relative movement between first and second portions of the coil turn-forming assembly during generation of the selected successive turns.

11. A method of developing at least one coil of electrically conductive wire for use in a magnetic core, said method comprising: positioning a coil turn-forming assembly, having first and second relatively movable portions, in alignment with a winder; generating turns of wire for the at least one coil about the coil turn-forming assembly by relative movement between the coil turn-forming assembly and the winder; and selectively varying the length of successive turns of wire by relative movement between the first and second portions of the coil turn-forming assembly during the generating of the turns of wire for the at least one coil.

12. A method of developing, in a coil group accommodating device, at least one coil of electrically conductive wire, said method comprising: positioning a coil turn-forming assembly, having at least two portions with one of its portions adjacent a corresponding turn receiving slot in the coil group accommodating device; generating turns of wire for the at least one coil about the coil turn-forming assembly; selectively varying the length of successive turns of wire for the at least one coil by moving the other portion of the coil turn-forming assembly relative to the one portion during the generating of the turns of wire for the at least one coil; and receiving the generated turns in the turn receiving slot during the turn-generating operation for developing the at least one coil in the turn receiving slot.

13. A method for developing in a coil group accommodating device at least one coil group comprising a predetermined number of serially connected coils of electrically conductive wire by generating turns of wire about a coil turn-forming assembly, the coil group accommodating device having a plurality of turn receiving slots; and the coil turn-forming assembly including a first portion with a plurality of turn-gauging steps, each step having an interruption, and a second portion having a plurality of guides; said method comprising: locating a first turn-gauging step in the path of wire and positioning a corresponding first guide in the interruption of the first turn-gauging step and adjacent a corresponding first turn receiving slot; generating a predetermined number of turns of wire about the first turn-gauging step and first guide to form the first coil; receiving the generated turns in the first turn receiving slot to develop the first coil in the coil group accommodating device; repeating the locating, positioning, generating and receiving operations until all the coils of the at least one coil group are developed directly in the coil group accommodating device.

14. A method as set forth in claim 13 wherein at least some of the previously generated turns for a coil are received in the corresponding slot as other turns for that coil are generated.

15. A method as set forth in claim 13 wherein the lengths of selected successive turns for at least a predetermined coil are varied by moving the first portion of the coil turn-forming assembly relative to the second portion of the turn-forming assembly during generation of the selected successive turns.

* * * * *